(No Model.)

A. H. CHILTON.
COMBINED HORSE DETACHER AND BRAKE.

No. 515,651. Patented Feb. 27, 1894.

WITNESSES:
Fred G. Dieterich
M. D. Blondel

INVENTOR
Annie H. Chilton
BY
ATTORNEYS.

THE NATIONAL LITHOGRAPHING COMPANY,
WASHINGTON, D. C.

UNITED STATES PATENT OFFICE.

ANNIE H. CHILTON, OF BALTIMORE, MARYLAND.

COMBINED HORSE-DETACHER AND BRAKE.

SPECIFICATION forming part of Letters Patent No. 515,651, dated February 27, 1894.

Application filed June 7, 1893. Serial No. 476,805. (No model.)

*To all whom it may concern:*

Be it known that I, ANNIE H. CHILTON, residing in the city of Baltimore and State of Maryland, have invented certain new and useful Improvements in a Combined Horse-Detacher and Vehicle-Brake, of which the following is a specification.

My invention has for its object to provide simple and effective means whereby the horse can be quickly detached from the shafts, such shafts held from the ground and the brakes applied simultaneously, the several parts being released by means of a releasing rod, chain or cord extended into the vehicle body within convenient reach of the driver.

It has also for its object to provide means whereby in case the horse should fall, he may be released by the same means and by drawing the wagon backward, the shafts being connected to the wagon body by spiral springs will yield and not be broken.

With other minor objects in view, which hereinafter will be referred to the invention consists in such details of mechanism and combination of parts as will be first described and particularly pointed out in the claims, reference being had to the accompanying drawings in which—

Figure 1:
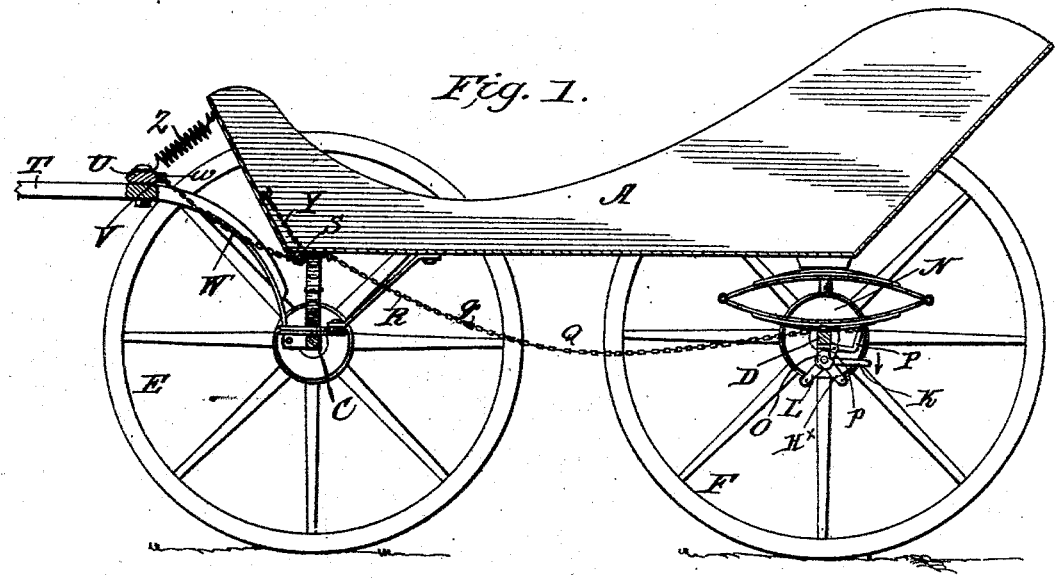
Figure 2:
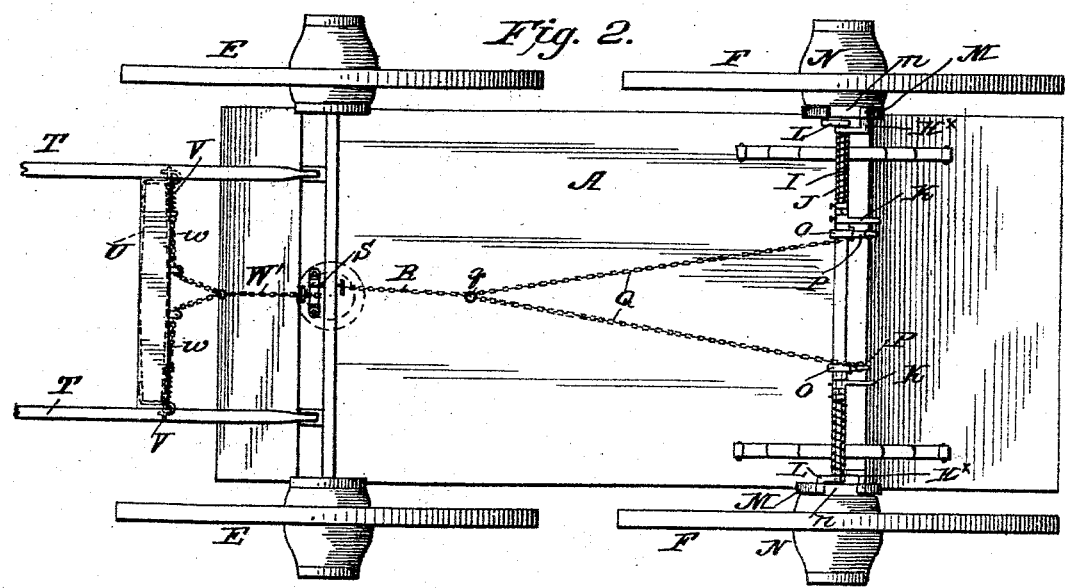
Figure 3:
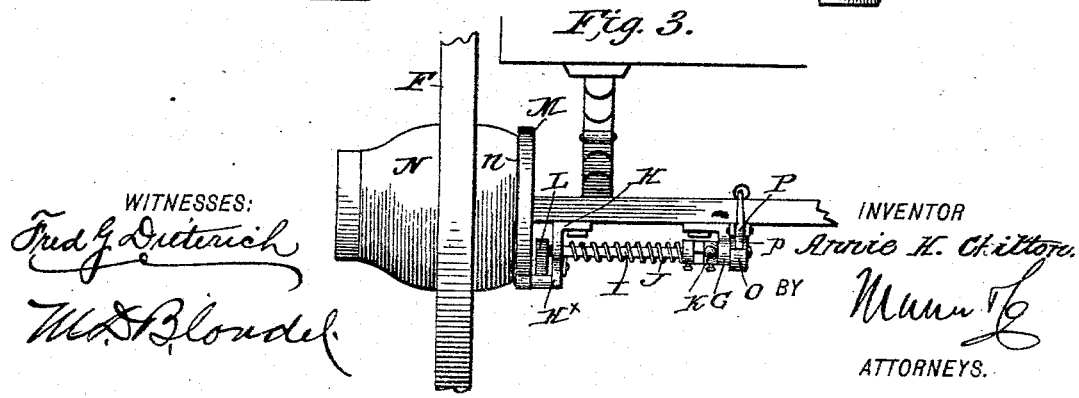

Figure 1 is a vertical longitudinal section of my improved devices. Fig. 2 is a bottom plan view of the same and Fig. 3 is a side elevation of the brake on an enlarged scale.

Referring to the accompanying drawings, A indicates the vehicle, C the front axle and D the rear axle on which are journaled the wheels E and F, such parts being of the ordinary construction.

Upon the rear axle D at each end are secured a pair of depending brackets G H, and in each pair of such brackets is journaled a rock shaft I, about which is disposed a torsion spring J which serves to normally turn it in one direction of movement, such spring having one end secured to the shaft while its other end is secured to the bracket H in the usual manner. Near the outer end such shafts I have a crank or lever K secured thereto, by means of which the tension of the springs can be adjusted in a manner presently described. At their inner ends the rock shafts I have crank members L, see Fig. 2, which are connected with one end of brake bands M, which are passed around bearing portions $n$ on the hubs N of the rear wheels; the opposite ends of such band brakes being secured to angle or crank arms $H^\times$ formed on the lower ends of the brackets H and projected angularly in reverse directions to the cranks L.

Upon the outer ends of the shafts I are secured notched collars O, with which are adapted to engage detents or latch members P as most clearly shown in Fig. 1 of the drawings.

So far as described it will be readily understood that when the lever K is turned in the direction indicated by the arrow in Fig. 1, tension will be applied to the spring J, which movement will also serve to separate the ends of the band brakes, and thereby loosely hold them on the bearing faces of the hubs, and when such shafts I have been turned until the notches of the collars O pass under the members $p$ of the latches P such latches then move in place and hold the shafts and the band brakes to their unapplied position. The means for releasing the said brake appliances consists preferably of chain connections Q Q arranged as shown which are joined at $q$ to a single chain R, which has its end passed over a guide or pulley S mounted preferably under the central portion of the front end of the wagon body.

T T indicate the vehicle shafts, and U the single tree to the ends of which spring actuated trace holding bolts V are secured to the inner ends of which, flexible connections or chains $w$ are secured, which in turn are secured to a single chain W' which passes over the pulley S, reversely to the chain R, such chain R and the chain W' being connected to a lift chain Y which extends up to within the wagon body as shown.

Z indicates a spring secured at one end to the wagon body and at its other end to the single tree, and such spring serves to support the shafts when the animal is detached therefrom.

From the foregoing description taken in connection with the drawings it will readily appear that by pulling upon the chain or cord Y, the connections Q Q, $w$, will be drawn taut and in consequence pull back the trace bolts, and trip the latch P to release the shaft I, which then through the medium of the torsional spring will be turned in the direction indicated by the arrow, thereby cause the crank arm to pull the band brakes tightly against the wheel hubs and effectively brake same.

To reset the brake devices the shafts I are again rocked through the medium of the levers K as before stated until the lock or detent P again engages the notched collar.

The devices are exceedingly simple in their construction, can be applied to any vehicle at a small cost, are easily manipulated and very effective for their desired purpose.

Having thus described my invention, what I claim, and desire to secure by Letters Patent, is—

1. An improved combined horse detacher and vehicle brake mechanism, comprising a spring actuated band brake mechanism arranged to engage one or more of the wheel hubs, a detent for normally holding such mechanism out of operative position, horse detaching devices on the vehicle shafts, a guide member on the vehicle body, an operating cord or chain connected to the brake band detent and passed up over the guide in one direction, an operating cord or chain connected to the detaching devices and passed over the guide in a reverse direction to the detent cord, and a single operating handle portion connected to the ends of such detent and detaching cords, extended up within the vehicle body, all arranged substantially as shown and for the purposes described.

2. The combination with one or more wheels of the vehicle, a brake band held on the hubs thereof, a shaft mounted on the vehicle held to rock in one direction by spring tension, said shaft having a crank arm, connected to one end of the brake band, a fixed arm connected to the other end of such band, a lock notch or projection on such shaft, a pivoted detent adapted to engage such lock notch on the shaft, and connections between such detent and an operating member on the wagon body whereby the detent is released from the shaft, and the brake band applied on such hub when the operating member is pulled upon all substantially as shown and described.

3. The combination with the shaft D and the wheel E, of the spring actuated rock shaft I journaled on the shaft having an angle arm L at its inner end, the fixed angle arm $H^{\times}$ inclined reversely to the arm L, the brake band M fitted over the wheel hub and having its ends secured to the arms L and $H^{\times}$ said shaft having a lock notch, the detent P adapted to engage such notch and the chain or cord connections, for operating the detent P all arranged substantially as shown and described.

4. The combination with the axles and supporting wheels, of the spring actuated rock shaft I, having a crank arm K and a notched collar O at its inner end and an angularly extending arm L at its opposite end, a fixed arm $H^{\times}$ and the band brake M secured at its ends to the arms L and $H^{\times}$ and adapted to fit over the wheel hub all arranged substantially as shown and described.

ANNIE H. CHILTON.

Witnesses:
ANNE H. S. HACK,
OLIVER F. HACK.